United States Patent
Ho

(10) Patent No.: US 10,477,402 B2
(45) Date of Patent: Nov. 12, 2019

(54) ONE-WAY KEY FOB AND VEHICLE PAIRING

(71) Applicant: Texas Instruments Incorporated, Dallas, TX (US)

(72) Inventor: Jin-Meng Ho, Plano, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 45 days.

(21) Appl. No.: 15/588,083

(22) Filed: May 5, 2017

(65) Prior Publication Data

US 2017/0303134 A1   Oct. 19, 2017

Related U.S. Application Data

(63) Continuation of application No. 13/969,154, filed on Aug. 16, 2013, now abandoned.
(Continued)

(51) Int. Cl.
*H04K 1/00* (2006.01)
*H04W 12/12* (2009.01)
(Continued)

(52) U.S. Cl.
CPC ......... *H04W 12/12* (2013.01); *H04W 12/003* (2019.01); *H04W 12/04* (2013.01); *H04L 2463/062* (2013.01)

(58) Field of Classification Search
CPC ... H04W 12/12; H04W 12/04; H04W 12/003; H04L 2463/062
See application file for complete search history.

(56) References Cited

U.S. PATENT DOCUMENTS 6,178,506 B1 * 1/2001 Quick, Jr. ............. H04L 9/0844
380/232
6,518,880 B2   2/2003 Johnson et al.
(Continued)

FOREIGN PATENT DOCUMENTS

CN    101083530 A    12/2007
EP    2305927 A1    6/2011
(Continued)

OTHER PUBLICATIONS

Office Action issued by Japanese Patent Office dated Jul. 10, 2019 for Japanese Patent Application No. 2018-171141.

*Primary Examiner* — Trong H Nguyen
*Assistant Examiner* — Amie C. Lin
(74) *Attorney, Agent, or Firm* — Kenneth Liu; Charles A. Brill; Frank D. Cimino

(57) ABSTRACT

Key fob and vehicle control unit identifiers (IDs) are used for entity authentication or trust transfer to achieve a secured initial pairing. The key fob is capable of transmitting only (not receiving) and is paired with a control unit in a vehicle or with any other control device. Use of the key fob and control unit IDs prevents unauthorized pairing and access to the operation key (OpKey) that is later used for communications between the devices. Elliptical curve cryptography (ECC) is used for strong security and efficient implementation. In the pairing process, device IDs are used for entity authentication and public key cryptography is used for easy key management. Symmetric encryption is used for fast normal operation and to accommodate key fob addition or revocation after key fob loss.

15 Claims, 6 Drawing Sheets

Related U.S. Application Data

(60) Provisional application No. 61/695,145, filed on Aug. 30, 2012.

(51) Int. Cl.
*H04W 12/04* (2009.01)
*H04W 12/00* (2009.01)

(56) References Cited

U.S. PATENT DOCUMENTS

| | | |
|---|---|---|
| 10,187,793 B2 | 1/2019 | Petel |
| 2003/0149666 A1* | 8/2003 | Davies ............... G06F 21/34 |
| | | 705/50 |
| 2003/0208753 A1* | 11/2003 | Corrigan ............ H04N 7/163 |
| | | 725/31 |
| 2007/0016798 A1 | 1/2007 | Narendra et al. |
| 2007/0198848 A1 | 8/2007 | Bjorn |
| 2007/0211900 A1* | 9/2007 | Tan ................. H04L 63/164 |
| | | 380/225 |
| 2008/0065892 A1 | 3/2008 | Bailey et al. |
| 2009/0160607 A1 | 6/2009 | Edwards et al. |
| 2010/0014671 A1* | 1/2010 | Moroney ............. H04N 7/165 |
| | | 380/262 |
| 2010/0199095 A1* | 8/2010 | Ho ..................... H04L 9/0844 |
| | | 713/171 |
| 2011/0215899 A1* | 9/2011 | Van Wiemeersch .... B60R 25/04 |
| | | 340/5.24 |
| 2012/0039474 A1 | 2/2012 | Ho |
| 2013/0259232 A1* | 10/2013 | Petel ................. H04L 63/0492 |
| | | 380/270 |

FOREIGN PATENT DOCUMENTS

| | | |
|---|---|---|
| JP | 20070096580 A | 4/2007 |
| JP | 2007265090 A | 10/2007 |
| JP | 2010016606 A | 1/2010 |
| JP | 2010226336 A | 10/2010 |
| JP | 2012134710 A | 7/2012 |

* cited by examiner

ONE-WAY KEY FOB AND VEHICLE PAIRING

CROSS-REFERENCE TO RELATED APPLICATIONS

This application is a continuation of and claims priority to U.S. patent application Ser. No. 13/969,154, filed Aug. 16, 2013, which claims the benefit of the filing date of U.S. Provisional Patent Application No. 61/695,145, which is titled "One-Way Keyfob-Car Pairing," filed on Aug. 30, 2012, the disclosures of which is hereby incorporated by reference herein in their entireties.

TECHNICAL FIELD

Embodiments of the invention are directed, in general, to vehicle security and, more specifically, to pairing a key fob that is capable of transmitting to, but not receiving from, a vehicle control unit with the unit.

BACKGROUND

Identifiers are assigned to a wireless key fob and a vehicle control unit by their respective manufacturers or by a vehicle manufacturer. The identifiers are used for authentication and/or trust transfer to achieve a secured initial pairing. For the key fob and the vehicle control unit to be able to communicate, the devices must be paired at some point in either the manufacturing or the sales process. The pairing of wireless key fobs and their respective vehicles conventionally requires the vehicle manufacturer to deliver a secret key associated with each key fob to the various vehicle dealers. The secret key is a cryptographic key that is used to associate or pair the key fob with a vehicle. Multiple key fobs are typically paired with each vehicle. To simplify design and reduce cost, a key fob may be capable of secured pairing by performing wireless transmission, to but not receiving from, the vehicle.

SUMMARY OF THE INVENTION

Embodiments of the invention provide methods for vehicle and key fob pairing using the identifiers of the key fob and a vehicle control unit. The identifiers are assigned by their respective manufacturers or by a vehicle manufacturer. The identifiers may be used for entity authentication and trust transfer to achieve secured initial pairing. Embodiments use device identifiers (IDs) to reduce message communications among the vehicle manufacturer, vehicle dealer, vehicle control unit, and key fob before, during, and after the vehicle-key fob pairing. This substantially decreases security vulnerabilities that could be otherwise exploited by hackers.

The key fob and vehicle control unit IDs are assigned by their respective manufacturers, or by a vehicle manufacturer, and are used for entity authentication or trust transfer to achieve secured initial pairing. The key fob is capable of transmitting only (not receiving) and is paired with a control unit in a vehicle or with any other control device. Use of the key fob and control unit IDs prevents unauthorized pairing and access to the operation key (OpKey) that is later used for communications between the devices. The embodiment described herein minimizes vulnerabilities before, during, and after pairing and reduces communication requirements and human involvement during pairing.

In the example described herein, elliptical curve cryptography (ECC) is used for strong security and efficient implementation; however, other encryption techniques may also be used. In the pairing process, device IDs are used for entity authentication and public key cryptography is used for easy key management. Symmetric encryption is used for fast normal operation and to accommodate key fob addition or revocation after key fob loss.

BRIEF DESCRIPTION OF THE DRAWINGS

Figure 1:
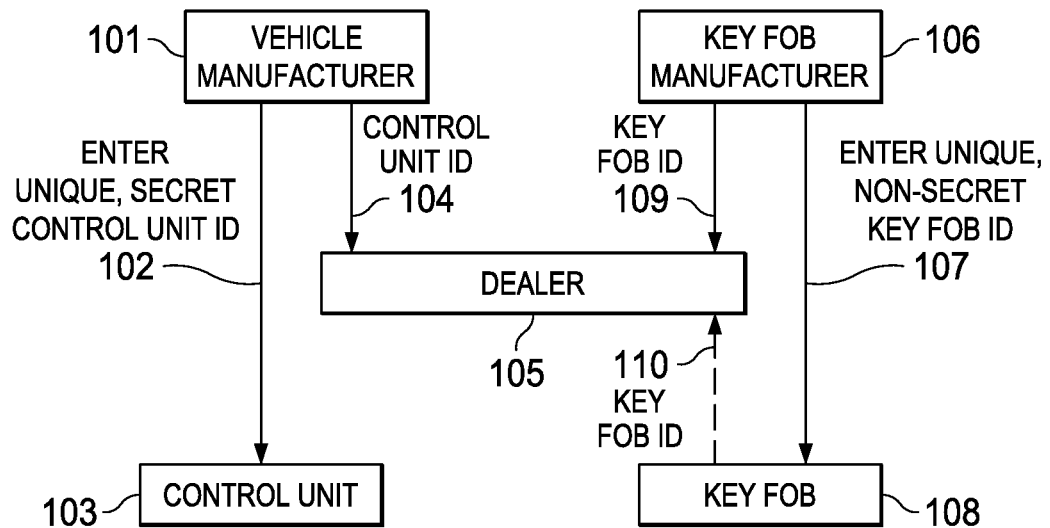

Having thus described the invention in general terms, reference will now be made to the accompanying drawings, wherein:

FIG. 1 is a block diagram illustrating an initial configuration and exchange of information in a system for pairing a vehicle to one or more key fobs.

FIGS. 2A-E illustrate steps for an initial pairing between a control unit and a selected key fob using a pairing device.

Figure 3:
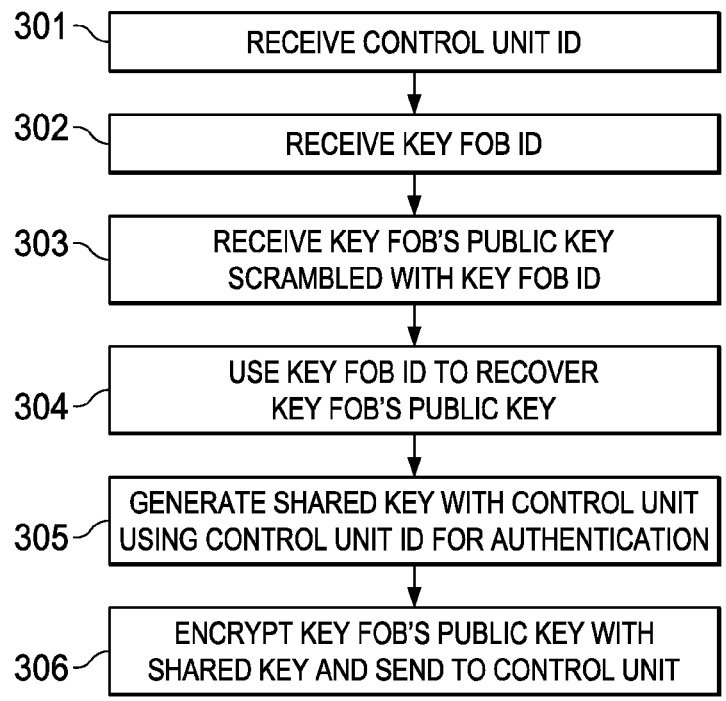

FIG. 3 is a flowchart illustrating steps performed by a pairing device according to one embodiment.

Figure 4:
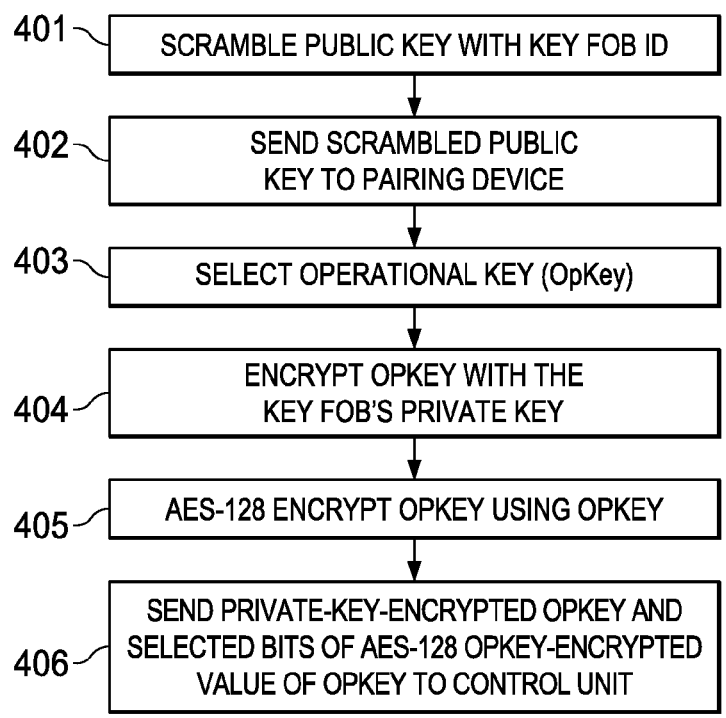

FIG. 4 is a flowchart illustrating steps performed by a key fob according to one embodiment.

Figure 5:
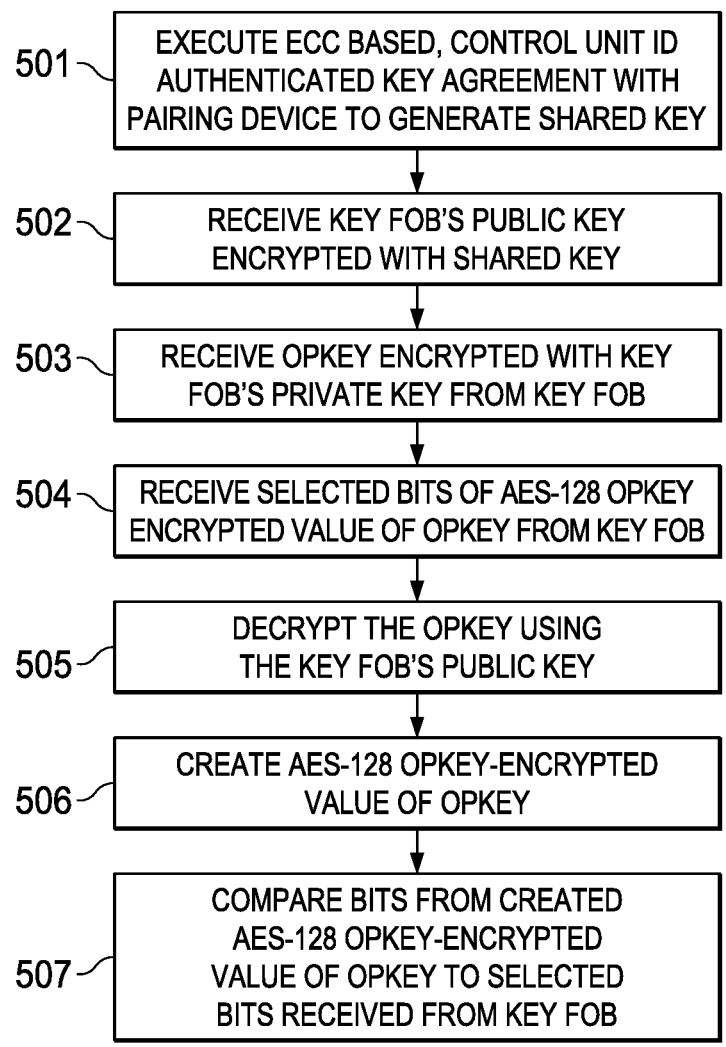

FIG. 5 is a flowchart illustrating steps performed by a control unit according to one embodiment.

Figure 6:
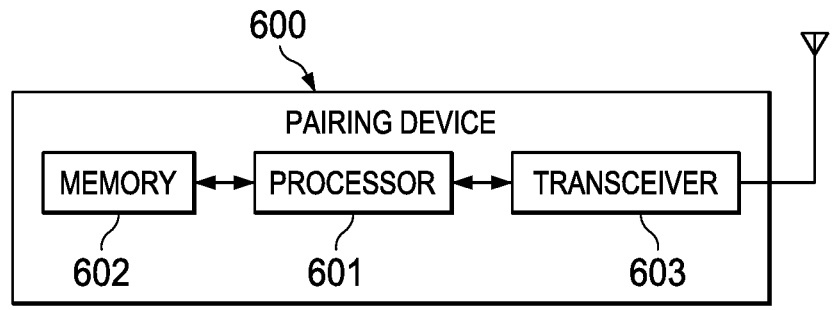

FIG. 6 is a block diagram of an example pairing device in accordance with one embodiment.

Figure 7:
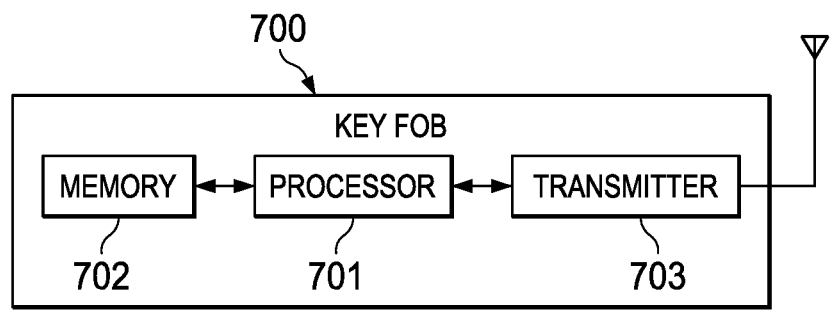

FIG. 7 is a block diagram of an example key fob in accordance with one embodiment.

Figure 8:
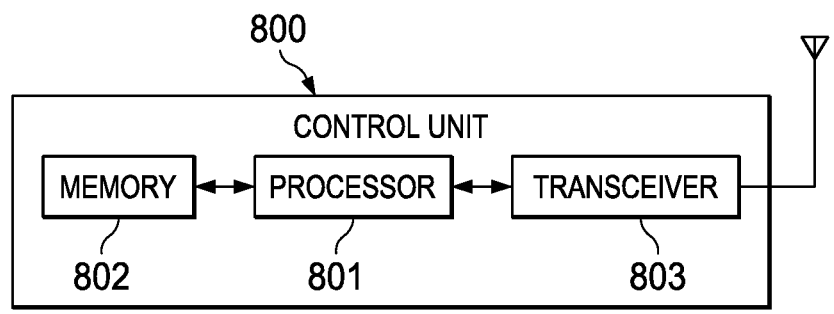

FIG. 8 is a block diagram of an example control unit in accordance with one embodiment.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

In one embodiments, a key fob that is capable of transmitting but not receiving is paired with a control unit in a vehicle. The control unit allows a user to perform certain operations, such as opening/closing or locking/unlocking vehicle doors through remotely using the key fob.

FIG. 1 is a block diagram illustrating an initial configuration and exchange of information in a system for pairing a vehicle to one or more key fobs. A vehicle manufacturer 101 provides a unique, secret control unit identifier (ID) 102 to a control unit 103. The control unit 103 may be any control device located inside or outside a vehicle, such as a control unit that locks/unlocks vehicle doors, opens/closes vehicle windows, turns on/off vehicle lights, etc.

Vehicle manufacturer 101 also provides the control unit ID 104 to a dealer 105. The control unit ID exchange 104 is performed in a secure or non-public manner. The dealer 105 should also maintain the secrecy of the control unit ID for system security.

Although the example used herein refers to a vehicle manufacturer 101 and a vehicle control unit, it will be understood that the control unit 103 may be used to control non-vehicle operations, such as opening/closing a garage door, gate, hotel entrance, remote home entry, etc. Similarly, other parties, such as a third party manufacturers, dealers, or resellers, may provide the control unit ID in place of vehicle manufacturer 101.

A key fob manufacturer 106 provides, loads, or installs a unique key fob ID 107 to a key fob 108. The key fob ID does not need to be kept secret, which allows users, such as dealer 105, to easily determine the key fob ID for a particular key fob 108, while completely eliminating the procedure and cost that would otherwise incur for maintaining the secrecy and authenticity. The dealer may obtain the key fob ID directly from the key fob manufacturer 106 in transaction 109. Alternatively, dealer 105 may obtain the key fob ID directly from the key fob 108 in transaction 110. For example, the key fob 108 may be marked with the key fob ID.

Using the process illustrated in FIG. 1 or some other process, the dealer 105 obtains both the secret control unit ID and the non-secret key fob ID. For example, dealer 105 may be a franchisee or licensee that sells, services, or repairs vehicles provided by manufacturer 101. Manufacturer 101 has a trusted relationship with dealer 105 that allows for exchange of the control unit ID while maintaining it as a secret. Dealer 105 may obtain key fobs and key fob IDs from any third-party manufacturer 106 without needing to maintain secrecy of the key fob ID.

In one embodiment, the key fob ID and control unit ID may be eight character hexadecimal words.

FIG. 2 illustrates an initial pairing between a control unit 201 and a selected key fob 202 using a pairing device 203, which may communicate with control unit 201 and/or key fob 202 wirelessly. Alternatively, pairing unit 203 may be capable of directly connecting to one or both of control unit 201 and key fob 202, such as by connecting using a USB cable or other link, during a pairing process. Additionally, control unit 201 and key fob 202 may communicate wirelessly or directly.

In addition to the key fob ID, key fob 202 has a public key and a private key that can be used for a password scrambled key agreement protocol, with the key fob ID serving as the password. The key agreement protocol may be based on elliptical curve cryptography (ECC).

Figure 2A:
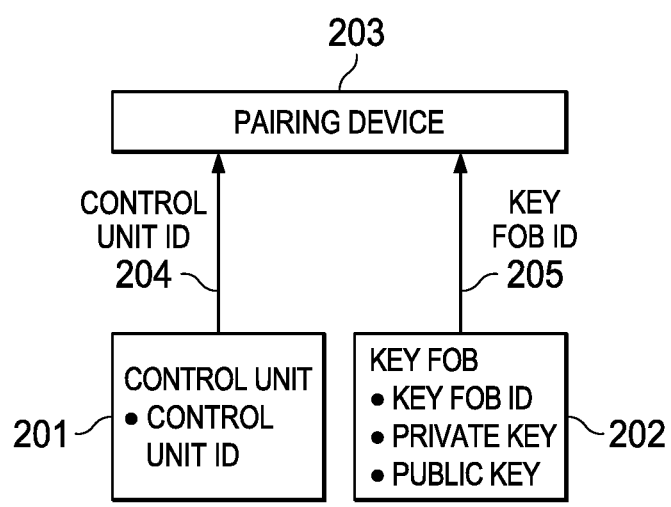

In FIG. 2A, during the pairing process, the dealer may select key fob 202 out of many available unused key fobs, which renders the actual key fob ID being used for pairing secret to others. The dealer also determines the control unit ID for control unit 201, which is maintained as a secret. The dealer then enters the control unit ID (204) and key fob ID (205) in pairing device 203.

Figure 2B:
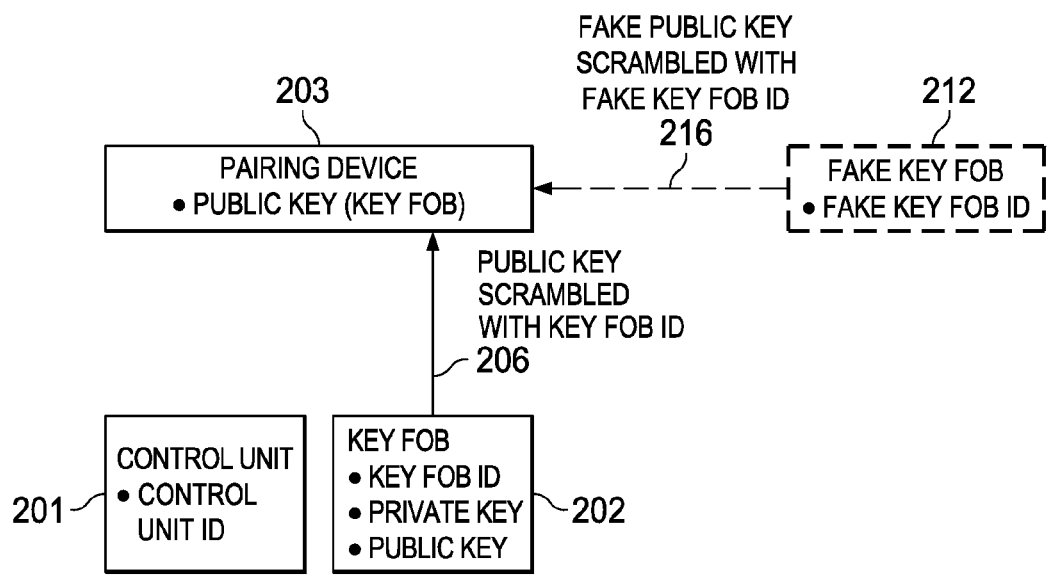

In FIG. 2B, key fob 202 sends its public key scrambled with the key fob ID (206) to pairing device 203. Using the key fob ID, which has already been provided, the pairing device 203 recovers the key fob's public key by unscrambling message 206.

An unauthorized, fraudulent, or malevolent party may attempt to introduce a fake key fob 212 into the pairing process by transmitting message 216 to pairing device 203. This attempt will be futile because that party does not know the ID of the key fob 202 selected by the dealer for pairing and hence will need to use a different ID to scramble the public key of the fake key fob 212. As a result, even if pairing device 203 did receive message 216 from fake key fob 212, pairing device 203 would not be able to unscramble the fake key fob's public key. Accordingly, a fake key fob 212 would not be able to inject itself into the pairing process.

Figure 2C:
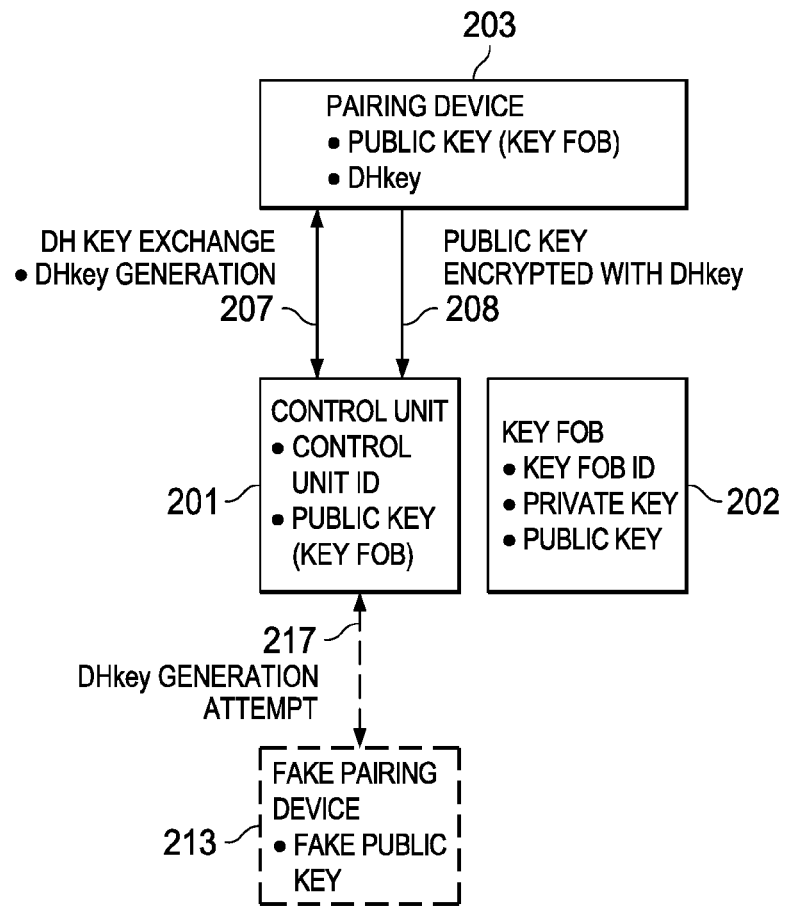

In FIG. 2C, pairing device 203 and control unit 201 execute an ECC-based key agreement protocol, such as a Diffie-Hellman key exchange (207), authenticated by a password taken or derived from the control unit ID. The pairing device 203 and control unit 201 authenticate each other with the control unit ID and generate an encryption key (DHkey) through the authenticated exchange 207. Pairing device 203 encrypts the key fob's public key recovered earlier from message 206 with the DHkey generated in exchange 207. Pairing device 203 then sends the encrypted key fob public key (208) to control unit 201, which recovers the key fob's public key using the DHkey that is shared with pairing device 203.

An unauthorized, fraudulent, or malevolent party may attempt to use a fake pairing device 213. However, because fake pairing device 213 does not know the secret control unit ID for control unit 201, its authentication with the control unit 201 will fail, thus generating no shared DHKey. Accordingly, a fake pairing device cannot be used to pair a key fob to the control unit 201.

Figure 2D:
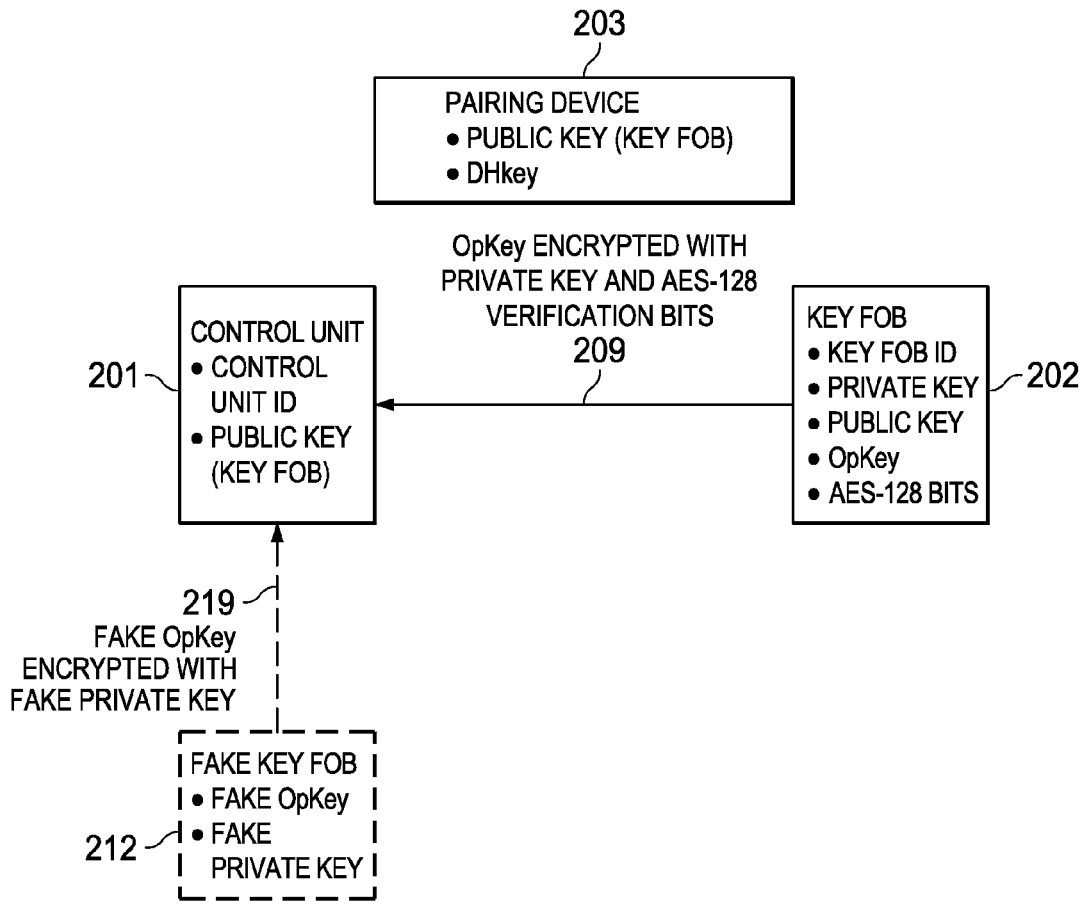

In FIG. 2D, key fob 202 selects an OpKey for use with control unit 201. Key fob 202 encrypts the OpKey with its private key. Key fob 202 also creates an AES-128 OpKey-encrypted value of OpKey. Key fob 202 extracts a number of bits (verification bits), such as the 8, 16, or 32 lowest-order bits, from the AES-128 OpKey-encrypted value of OpKey for use in verifying exchanges with the control unit. Key fob 202 sends (209) the private-key-encrypted OpKey and the AES-128 verification bits to control unit 201.

Control unit 201 decrypts the OpKey using the key fob's public key, which was provided by pairing device 203 in message 208. Control unit 201 computes an AES-128 OpKey-encrypted value of the extracted OpKey and extracts a number of bits from the AES-128 OpKey-encrypted value of OpKey. These bits created by control unit 201 are compared to the verification bits received from key fob 202 to verify that the decrypted value of OpKey was correct.

An unauthorized, fraudulent, or malevolent party may attempt to use fake key fob 212 to pair with control unit 201. However, because fake key fob 212 did not get its public key transferred to pairing device 203, fake key fob 212 never had its public key sent to control unit 201. As a result, when fake key fob 212 sends a fake OpKey encrypted with its private key, control unit 201 is not able to decrypt the fake OpKey without the proper corresponding public key. Accordingly, a fake key fob is not able to pair with the control unit 201.

Figure 2E:
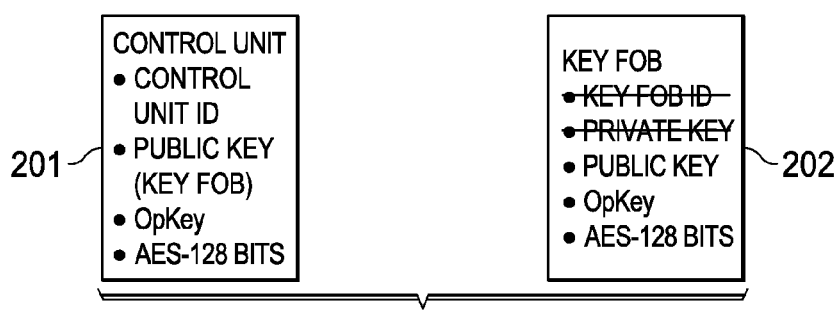

As illustrated in FIG. 2E, the key fob 202 may delete its key fob ID and private key after the initial pairing with control unit 201. This prevents unauthorized third-parties from accessing those values and using them to attempt to pair an unauthorized key fob with control unit 201. Additionally, this prevents the key fob 202 from pairing with other devices.

FIG. 3 is a flowchart illustrating steps performed by a pairing device according to one embodiment. In step 301, the pairing device receives a control unit ID. The control unit ID should be kept secret to the maximum extent practicable so that unauthorized users cannot pair key fobs to the control unit. In one embodiment, the control unit ID is available from a manufacturer or vendor, but cannot be determined directly from the control unit itself. In step 302, the pairing device receives a key fob ID. The key fob ID may be provided by the key fob device itself or by a key fob manufacturer or vendor.

In step 303, the pairing device receives the key fob's public key, which has been scrambled with the key fob ID. In step 304, the pairing device recovers the key fob's public key by unscrambling the information received in step 303 using the key fob ID received in step 302. Only a device that has the key fob's ID can recover scrambled public key. If the pairing device selects the key fob at random and/or selects the key fob from a large group of key fobs, then unauthorized receivers of the scrambled public key will not know which key fob ID to use to recover the public key.

In step 305, the pairing device generates a shared key with the control unit using the control unit ID for authentication. In one embodiment, the shared key is generated using the Diffie-Hellman key exchange. In step 306, the pairing device encrypts the key fob's public key with the shared key and sends it to the control unit. Because the key fob only sends its public key to the pairing device, the control unit can only get the public key via the pairing device. Additionally, because the key fob's public key is scrambled with the key fob ID when sent to the pairing device and encrypted with the shared key when sent to the control unit, an outside observer is not able to obtain the key fob's public key without knowing this additional information.

FIG. 4 is a flowchart illustrating steps performed by a key fob according to one embodiment. In step 401, the key fob scrambles its public key with the key fob ID. In step 402, the key fob sends the scrambled public key to the pairing device. The pairing device then unscrambles the public key and passes it to the control unit as described herein.

In step 403, the key fob selects an OpKey and, in step 404, encrypts the OpKey with the key fob's private key. In step 405, the key fob generates an AES-128 OpKey encrypted value of the OpKey. In step 406, the key fob sends the encrypted OpKey and selected bits of the AES-128 OpKey encrypted value of the OpKey to the control unit.

FIG. 5 is a flowchart illustrating steps performed by a control unit according to one embodiment. In step 501, the control unit executes an ECC-based key agreement with the pairing device using the control unit ID for authentication. In step 502, the control unit receives the key fob's public key from the pairing device, where the public key is encrypted with the shared key.

In step 503, the control unit receives the OpKey from the key fob, where the OpKey is encrypted using the key fob's private key. In step 504, the control unit receives selected bits of an AES-128 OpKey-encrypted value of OpKey from the key fob.

In step 505, the control unit decrypts the OpKey using the key fob's public key, which was received from the pairing device in step 502. In step 506, using the decrypted OpKey, the control unit creates an AES-128 OpKey-encrypted value of Opkey. Finally, in step 507, the control unit compares bits from the AES-128 OpKey-encrypted value of Opkey to the selected bits received from the key fob in step 504.

Following the processes outlined in FIGS. 4 and 5, both the key fob and the control unit have the value of OpKey, which can be used for operations between the key fob and the control unit. One example of the operations between the key fob and the control unit is disclosed in pending U.S. patent application Ser. No. 13/969,133, titled "One-Way Key Fob and Vehicle Pairing Verification, Retention, and Revocation," filed on Aug. 16, 2013, the disclosure of which is hereby incorporated by reference herein in its entirety.

FIGS. 6, 7, and 8 show block diagrams of an example pairing device 600, key fob 700, and control unit 800, respectively, in accordance with various examples discussed herein. The three devices—pairing device 600, key fob 700, and control unit 800—may each comprise a processor (601, 701, 801), a memory (602, 702, 802), and a transceiver or transmitter (603, 703, 803). The processors of the devices may be used to perform the public key scrambling or descrambling computations, authentication computations, common secret key generation computations, public key or OpKey encryption or decryption computation, and OpKey verification value computations that take place during the pairing process. The processors may be a standard CPU, a microcontroller, a low-power digital signal processor, etc. and may be capable of performing complex calculations in a short time.

The memories of the devices may be used to store the public and private key pairs associated with their respective. Alternatively or additionally, the memories of the three devices may be used to store the IDs of their own or the other devices. For example, the pairing device 600 may store both the key fob ID and control unit ID before initiating a paring sequence. The memories may be a non-volatile storage device such as a flash memory or an EEPROM.

The transceivers for the three devices may be wired (not shown), wireless, or capable of both. The transceivers may be used by the devices to communicate the device IDs, public keys, and/or scrambled or encrypted data during the initial configuration steps and the initial pairing steps. The key fob allows for remote entry and control of vehicles or other devices and may use wireless technology, such as Bluetooth, LF, or UHF, for those transmissions. The devices may also be able to communicate via a wire during the initial pairing process. The key fob transmitter 703 is capable of transmitting only and does not receive signals from the pairing device 600 or control unit 800.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A system comprising:
   a first device comprising:
   a first memory to store an operation key, a public key, and a private key, each of the operation key, public key, and private key being associated with the first device;
   a first processor operable to:
   encrypt the operation key using the private key to produce a private key-encrypted operation key;
   use an encryption based on the Advanced Encryption Standard (AES) to compute an AES-encrypted value of the operation key; and
   a first transmitter to transmit a message, the message including the private key-encrypted operation key and verification bits that are selected first bits extracted from the AES-encrypted value of the operation key; and
   a second device comprising:
   a receiver to receive the message;
   a second memory to store the public key; and
   a second processor operable to:
   decrypt the private key-encrypted operation key using the public key to recover the operation key;
   compute an AES-encrypted value of the recovered operation key;
   compare selected second bits of the AES-encrypted value of the recovered operation key to the verification bits received in the message to determine whether the selected second bits match the verification bits, wherein the positions of the selected second bits in the AES-encrypted value of the recovered operation key correspond to the positions of the selected first bits extracted from the AES-encrypted value of the operation key; and pair the first device with the second device when the selected second bits match the verification bits.

2. The system of claim 1, wherein the first processor is operable to cause the private key to be deleted from the first memory after the first device is paired with the second device.

3. The system of claim 1, wherein the encryption based upon AES is AES-128 encryption.

4. The system of claim 3, wherein the selected first bits correspond to a predetermined number of lowest order bits of the AES-encrypted value of the operation key.

5. The system of claim 4, wherein the predetermined number of lowest order bits of the AES-encrypted value of the operation key is 8.

6. The system of claim 4, wherein the predetermined number of lowest order bits of the AES-encrypted value of the operation key is 16.

7. The system of claim 4, wherein the predetermined number of lowest order bits of the AES-encrypted value of the operation key is 32.

8. The system of claim 1, wherein the first device is a key fob device and the second device is a control unit of a vehicle.

9. The system of claim 1, wherein the selected first bits is only a portion of the bits of the AES-encrypted value of the operation key.

10. The system of claim 9, wherein the selected first bits correspond to a predetermined number of lowest order bits of the AES-encrypted value of the operation key.

11. The system of claim 10, wherein the predetermined number of lowest order bits of the AES-encrypted value of the operation key is 8.

12. The system of claim 10, wherein the predetermined number of lowest order bits of the AES-encrypted value of the operation key is 16.

13. The system of claim 10, wherein the predetermined number of lowest order bits of the AES-encrypted value of the operation key is 32.

14. A system comprising:
a first device comprising:
a first memory to store an operation key, a public key, and a private key, each of the operation key, public key, and private key being associated with the first device;
a first processor operable to:
encrypt the operation key using the private key to produce a private key-encrypted operation key;
use a first encryption type to compute an encrypted value of the operation key; and
a first transmitter to transmit a message that includes the private key-encrypted operation key and verification bits that are selected first bits extracted from the encrypted value of the operation key; and
a second device comprising:
a receiver to receive the message;
a second memory to store the public key; and
a second processor operable to:
decrypt the private key-encrypted operation key using the public key to recover the operation key;
compute an encrypted value of the recovered operation key using the first encryption type;
compare selected second bits of the encrypted value of the recovered operation key to the verification bits received in the message to determine whether the selected second bits match the verification bits, wherein the positions of the selected second bits in the encrypted value of the recovered operation key correspond to the positions of the selected first bits extracted from the encrypted value of the operation key; and
pair the first device with the second device when the selected second bits match the verification bits.

15. The system of claim 14, wherein the selected first bits is only a portion of the bits of the encrypted value of the operation key.

* * * * *